June 14, 1966  J. GASSMANN ETAL  3,255,736
ROTARY PISTON ENGINE
Filed Oct. 9, 1961 4 Sheets-Sheet 1
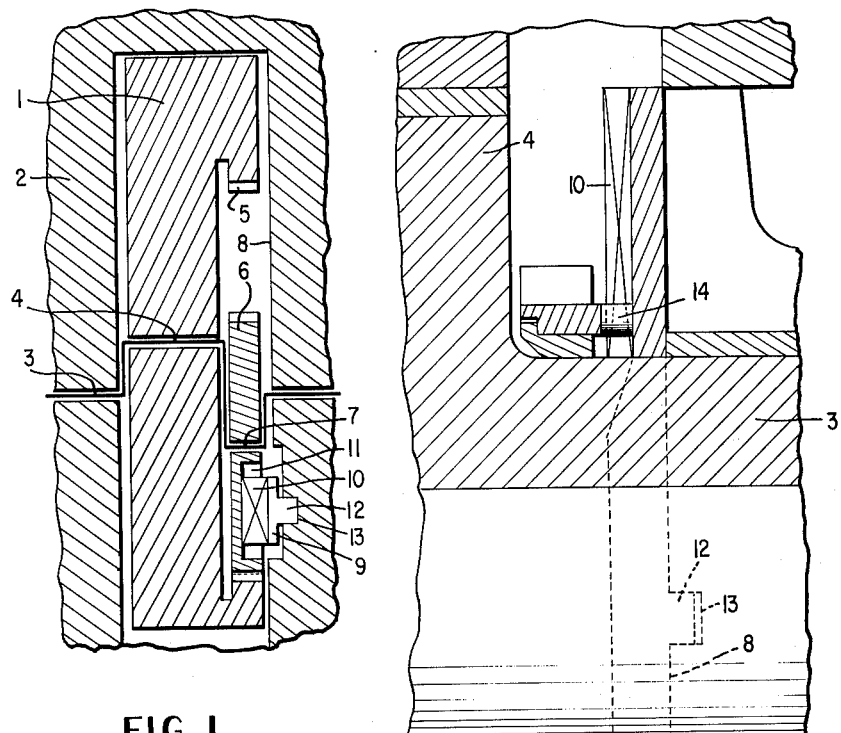
FIG. I
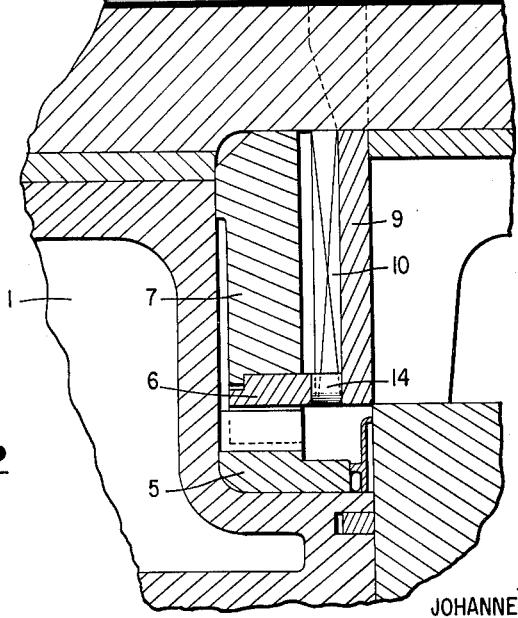
FIG. 2
INVENTORS.
JOHANNES GASSMANN
EBERHARD BRAUN
BY RICHARD EHRHARDT
*Dicks and Craig*
ATTORNEYS.

June 14, 1966   J. GASSMANN ETAL   3,255,736
ROTARY PISTON ENGINE

Filed Oct. 9, 1961   4 Sheets-Sheet 2

INVENTORS.
JOHANNES GASSMANN
EBERHARD BRAUN
BY RICHARD EHRHARDT
*Dicke and Craig*
ATTORNEYS.

June 14, 1966  J. GASSMANN ETAL  3,255,736
ROTARY PISTON ENGINE
Filed Oct. 9, 1961  4 Sheets-Sheet 3

INVENTORS.
JOHANNES GASSMANN
EBERHARD BRAUN
RICHARD EHRHARDT

BY Dicke & Craig

ATTORNEYS.

June 14, 1966  J. GASSMANN ET AL  3,255,736
ROTARY PISTON ENGINE
Filed Oct. 9, 1961  4 Sheets-Sheet 4

FIG. 6

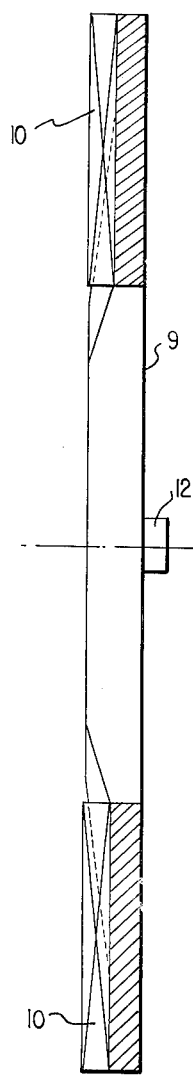

FIG. 8

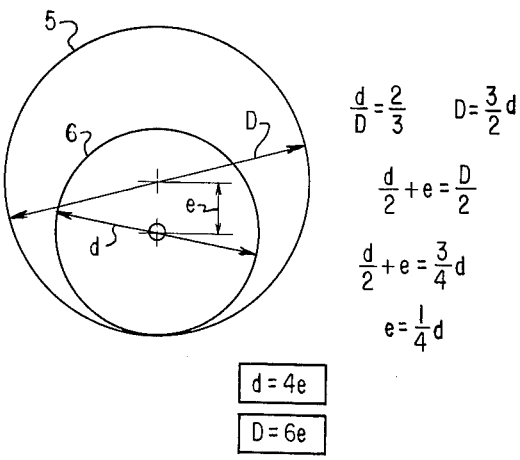

$\dfrac{d}{D} = \dfrac{2}{3}$  $D = \dfrac{3}{2}d$ $\dfrac{d}{2} + e = \dfrac{D}{2}$ $\dfrac{d}{2} + e = \dfrac{3}{4}d$ $e = \dfrac{1}{4}d$ $\boxed{d = 4e}$ $\boxed{D = 6e}$

FIG. 9

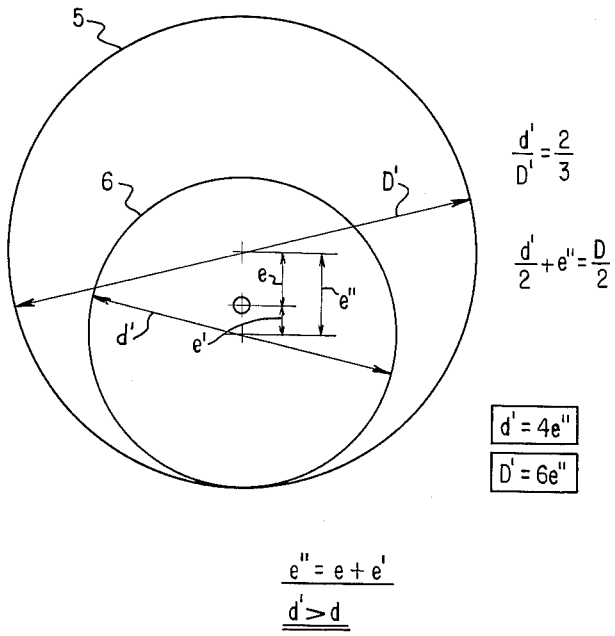

$\dfrac{d'}{D'} = \dfrac{2}{3}$ $\dfrac{d'}{2} + e'' = \dfrac{D'}{2}$ $\boxed{d' = 4e''}$ $\boxed{D' = 6e''}$ $\underline{e'' = e + e'}$
$\underline{d' > d}$

INVENTORS.
JOHANNES GASSMANN
EBERHARD BRAUN
RICHARD EHRHARDT

BY Dicke & Craig
ATTORNEYS.

United States Patent Office 3,255,736
Patented June 14, 1966

3,255,736
ROTARY PISTON ENGINE
Johannes Gassmann, Altbach, near Esslingen, Eberhard Braun, Waiblingen, and Richard Ehrhardt, Stuttgart-Unterturkheim, Germany, assignors to Daimler-Benz Aktiengesellschaft, Stuttgart-Unterturkheim, Germany
Filed Oct. 9, 1961, Ser. No. 143,841
Claims priority, application Germany, Oct. 18, 1960, D 34,543
12 Claims. (Cl. 123—8)

The present invention relates to a rotary piston internal combustion engine of trochoidal construction provided with a polygonal piston within an epitrochoidally-shaped housing which carries out a rotary movement about an eccentric arranged on the drive shaft and in which this rotary movement is realized by a toothed gear wheel provided with internal teeth arranged at the piston and a pinion meshing with the toothed gear.

With a known prior art internal combustion engine of this type provided with a triangular piston within a housing having a two-arched epitrochoid, the planet-like rotary movement of the piston on the eccentric of the drive shaft is achieved by a concentrically mounted externally-toothed pinion fast with or secured to the housing which engages with an internally toothed gear rotating with the piston. In order to attain the rotary speeds of the drive shaft and of the piston necessary for the practical operation of such an internal combustion engine, the number of teeth of the externally toothed pinion and of the internally toothed gear must bear a ratio of 2:3 to each other. Furthermore, since with the construction the ratio of the generating radius R for the trochoidal configuration to the eccentricity $e$ is fixed within certain limits, there is available for the diameter of the drive shaft within the pinion secured to the housing only a space which is smaller than four times the value of the eccentricity $e$. For an air-compressing internal combustion engine or diesel engine, especially in multi-disk arrangement, this space is no longer sufficient in order to provide a sufficiently sturdy drive shaft.

It has now been discovered that notwithstanding the retention of a toothed or meshing arrangement for the realization of the rotary movement of the piston on the eccentric, the diameter of the drive shaft may be made larger if, according to the present invention, the pinion is supported on an eccentric arranged on the drive shaft which is disposed displaced by 180° with respect to the eccentric, the diameter of the drive shaft may be made are provided which prevent the pinion against rotation about itself.

The means which prevent the pinion against rotation about itself may consist, in a simple manner, of an essentially annularly shaped intermediate member which is operatively connected, on the one hand, with the pinion and, on the other, with the housing side wall in such a manner that it is adapted to be displaced with respect to the housing in a diametric plane of the pinion and in a plane disposed perpendicularly thereto. The intermediate member may be provided with guide portions of which one guide portion facing the pinion is adapted to be displaced between guide cams at the pinion and of which another guide portion facing the housing side wall is adapted to be displaced within a groove of the housing side wall.

According to another embodiment of the present invention, the means which prevent the pinion against a rotation about itself may consist of preferably three cranks displaced with respect to the other by 120° and engaging the pinion, the lengths of which correspond to the eccentricity of the pinion and which are supported in the housing side wall.

According to still a further embodiment of the present invention, the means which prevent the pinion against rotation about itself may consist of three pins arranged at the pinion and displaced by 120° with respect to each other which abut against the cylindrical surfaces of disks arranged at the housing side wall whereby the distance from the center of each pin to the center of the corresponding disk corresponds to the eccentricity of the pinion. It is thereby particularly advantageous if the disks arranged at the housing side wall consist of ball bearings against the outer races of which abut the pins secured at the pinion.

Accordingly, it is an object of the present invention to provide a rotary piston internal combustion engine of the type mentioned hereinabove which eliminates, by simple means, the shortcomings enumerated hereinabove that are normally encountered with the prior art constructions.

Another object of the present invention resides in the provision of a rotary piston internal combustion engine in which the drive shaft may be constructed relatively sturdy and of relatively large dimensions notwithstanding the use of a meshing gear arrangement for the realization of the rotary movement of the piston about the eccentric.

Another object of the present invention resides in the provision of a rotary piston internal combustion engine of epitrochoidal construction in which adequate space is provided for a sufficiently rigid construction of the drive shaft, even with a multi-disk arrangement for use with an air-compressing internal combustion of relatively low structural height.

These and other objects, features and advantages of the present invention will become more obvious from the following description when taken in connection with the accompanying drawing which shows, for purposes of illustration only, several embodiments in accordance with the present invention, and wherein FIGURE 1 is a purely schematic longitudinal cross section through an internal combustion engine according to the present invention in which the pinion is mounted on an eccentric and is safeguarded against rotation about itself by means in accordance with the present invention;

FIGURE 2 is a partial longitudinal cross sectional view, on an enlarged scale, through an internal combustion engine provided with displaceable guide means for the intermediate member arranged between the pinion and the housing in accordance with the present invention;

FIGURE 6 is an axial cross sectional view through only the intermediate member 9 of an internal combustion engine in accordance with the present invention;

Figure 7:
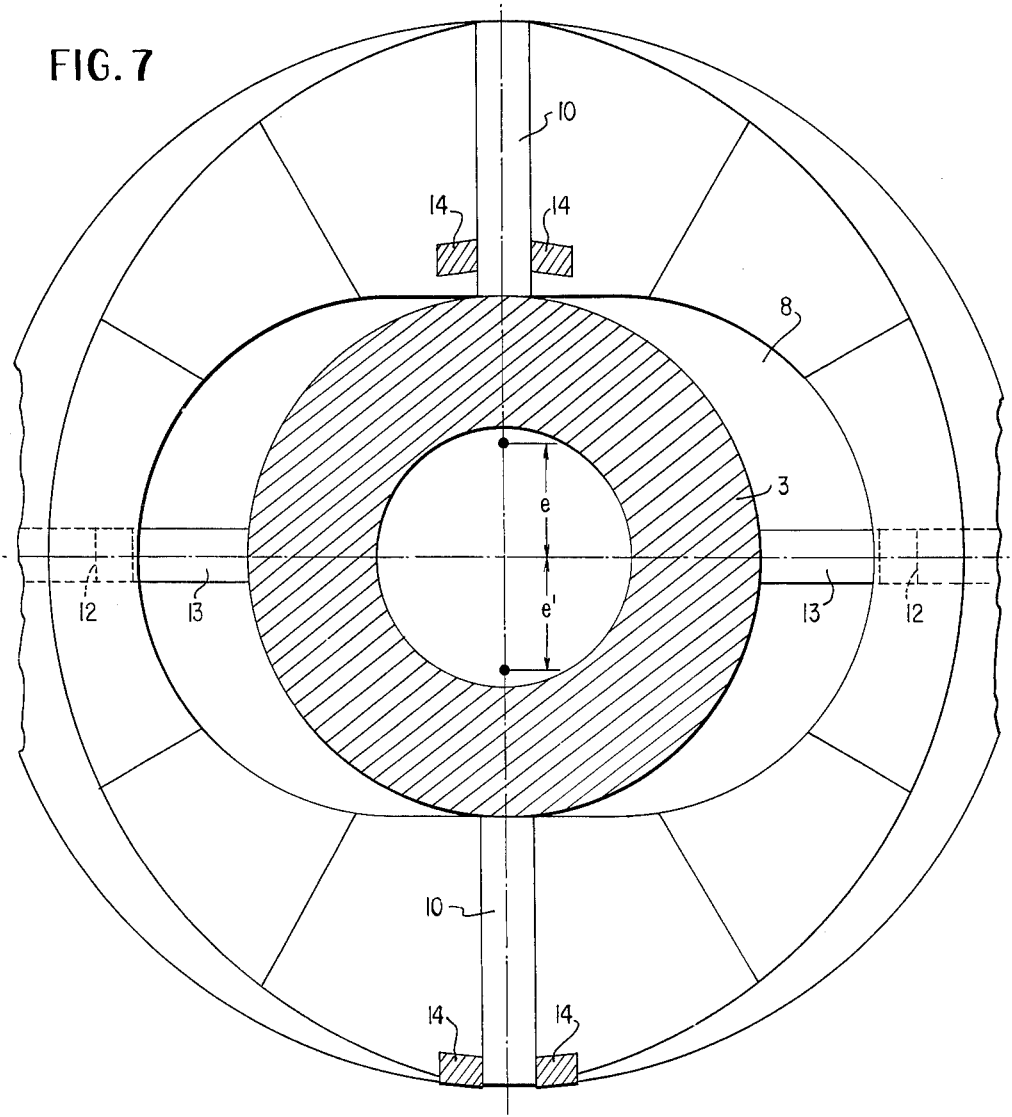

FIGURE 7 is a partial transverse cross sectional view of a rotary piston internal combustion engine in accordance with the present invention and showing the intermediate member 9 in plan view as arranged at the side wall of the housing, and FIGURES 8 and 9 are schematic views explanatory of the present invention and showing why a larger shaft diameter may be used with the internal combustion engine in accordance with the present invention.

Referring now to the drawing wherein like reference numerals are used throughout the various views to designate like parts, and more particularly to FIGURE 1, which illustrates schematically the principle of the present invention, the piston 1 is supported, in a manner known per se, within the housing 2 on the eccentric 4 rigid with the drive shaft 3. In order to assure a predetermined rotational speed ratio between the number of rotations of the drive shaft 3 and the number of rotations of the piston 1, the piston 1 is provided at one side thereof with a toothed gear wheel having internal teeth 5 with which meshes the pinion 6. The pinion 6 is supported on the eccentric 7 provided on the drive shaft 3 which eccentric 7 is arranged in a manner displaced by 180° with respect to the eccentric 4 on which the piston 1 is supported. In order to enable the center of the pinion 6 to carry out a circular motion about the center longitudinal axis of the drive shaft 3 by reason of the bearing support of the pinion 6 on the eccentric 7, while at the same time preventing rotary movement of the pinion 6 about itself, there is provided between the pinion 6 and the side wall 8 of the housing an intermediate member 9 adapted to be displaced and operable in the manner of a Cardan or Oldhan coupling. The intermediate member 9 is provided with a guide ledge portion 10 which engages into a groove 11 provided within and extending along a diameter of the pinion 6, and is provided in a position perpendicular to the guide ledge portion 10 with another guide ledge portion 12 which engages into a corresponding groove 13 provided in the side wall 8. Hence, the pinion 6 is held against rotation about the longitudinal axis of the drive shaft 3 but is able to displace its own axis in two mutually perpendicular directions, corresponding to the directions of the grooves 11 and 13.

Figure 5:
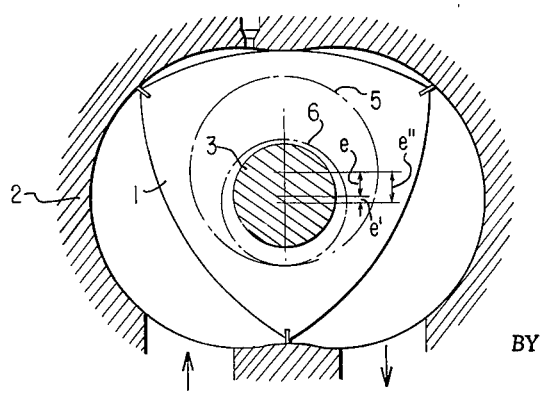
FIGURE 5 is a transverse cross sectional view through an internal combustion engine in accordance with the present invention.

In the schematic illustration of FIGURE 1, the intermediate member 9 adapted to be displaced was illustrated, for sake of clarity, eccentrically to the pinion 6. FIGURES 2 and 5, in contrast thereto, illustrates a practical embodiment of a rotary piston internal combustion engine in accordance with the present invention in which the intermediate member 9 (FIGURES 2, 6 and 7) adapted to be displaced is constructed of annular shape and is arranged on the drive shaft 3 between the pinion 6 supported on the eccentric 7 and the side wall 8 of the housing. The connection between the intermediate member 9 and the pinion 6 takes place by means of the guide cams 14 (FIGURES 2 and 7) rigid with the pinion 6 which surround on both sides the guide ledge portion 10 (FIGURES 2, 6 and 7) rigid with the intermediate member 9, and the connection between the intermediate member 9 and the housing 2, 8 takes place by the guide ledge portion 12 (FIGURES 2, 6 and 7) rigid with the intermediate member 9 which engages into the groove 13 arranged in the side wall 8 of the housing. Both guide portions 10 and 12 are disposed 90° displaced with respect to each other. With a rotation of the drive shaft 3, the piston 1 moves about the eccentric 4 in a predetermined ratio determined by the toothed arrangement of the gear wheel provided with internal teeth 5 and of the pinion 6, whereby the pinion 6 rotates with its center about the center longitudinal axis of the drive shaft 3 but by reason of the operative interposition of the intermediate member 9 does not rotate about itself and additionally does not come out of engagement with the toothed gear 5. The intermediate member 9 is thereby displaced by moving between the guide cams 14 and within the groove 13 corresponding to the position of the eccentric 7. As a result of the arrangement in accordance with the present invention, it is possible to make the diameter of the drive shaft 3 considerably larger than if the pinion 6 were arranged concentrically on the drive shaft 3.

As is well known, and also as mentioned above, with a housing having a two-arched epitrochoid as internal surfaces such as illustrated in connection with FIGURE 5, the number of teeth of the externally toothed pinion and of the internally toothed gear must bear a ratio of 2:3 to each other. In FIGURE 8, the diameter of the pinion 6 is designated by $d$ while the diameter of the internally toothed ring gear 5 is designated by $D$. As is also well known and as mentioned above, the diameter $d$ of the pinion 6 with such an arrangement has a predetermined relationship to the eccentricity which is $d=4e$. Similarly, with such an arrangement the diameter $D=6e$ as is also well known. Hence, since the drive shaft 3 has to extend through the pinion 6, the diameter of the drive shaft 6 must be smaller than $d$; that is must be smaller than $4e$.

Turning now to FIGURE 9, which corresponds to an arrangement as illustrated in FIGURES 1, 2, 5, 6 and 7, the total eccentricity $e''$ is composed of the eccentricity $e$ plus the eccentricity $e'$, the eccentricity $e$ being the same as in FIGURE 8, and the eccentricity $e'$ corresponding to the eccentricity due to the use of the eccentric 7. Since $e''$ is obviously larger than $e$, the diameter $d'$ which again is equal to $4e''$ can be the larger the greater the eccentricity $e''$, i.e., can be larger than the diameter $d$ of FIGURE 8. Since the drive shaft 3 still has to extend through the pinion 6, which, according to FIGURE 9, however, can be made larger, it should be obvious that the diameter of the drive shaft 3 can be made correspondingly larger.

Figure 3:
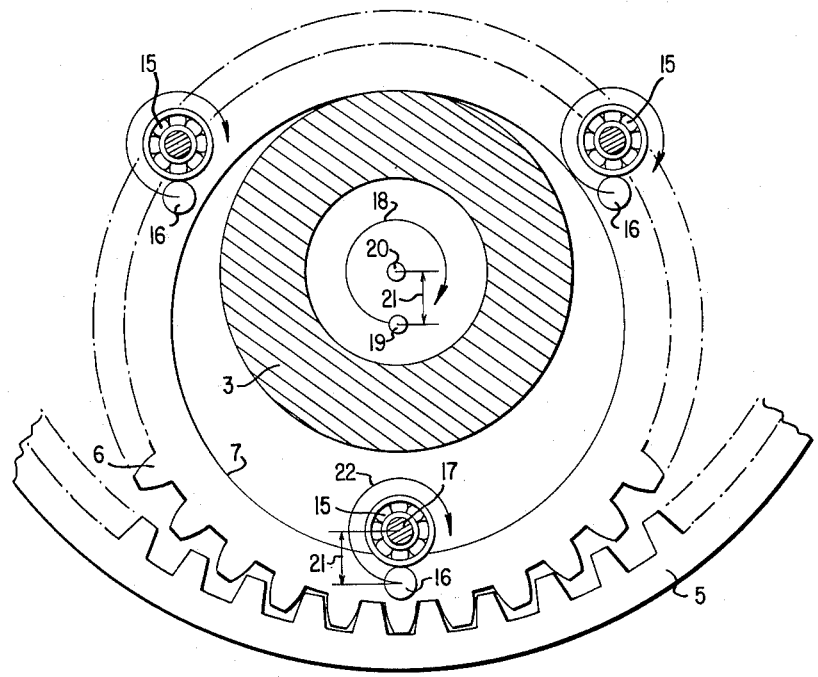
FIGURE 3 is a partial schematic view of a second embodiment of a displaceable guide means of the pinion in accordance with the present invention.
Figure 4:
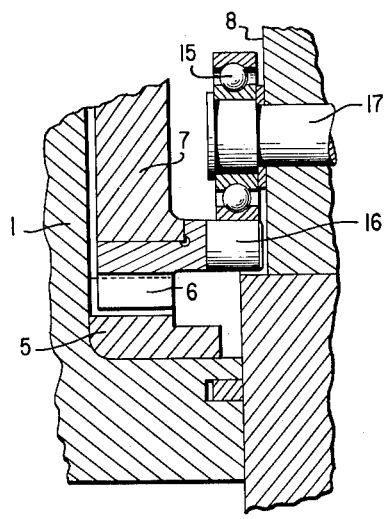
FIGURE 4 is a partial longitudinal cross sectional view, on an enlarged scale, through the guide means of FIGURE 3.

FIGURES 3 and 4 illustrate an embodiment of the present invention in which the intermediate member 9 of FIGURES 1 and 2 is replaced by the ball bearings 15 and the pins 16. In this embodiment, three pins 16, displaced by 120° with respect to each other, are arranged at the pinion 6 and three ball bearings 15 on shafts 17 are arranged at the side wall 8 of the housing. The pins 16 abut against the outer cage or outer bearing race surfaces of the ball bearings 15. With a movement of the drive shaft 3 in the direction of arrow 18, the center 19 of the eccentric 7 and of the pinion 6 describes a circle about a center longitudinal axis 20 of the drive shaft 3. The radius of this circle corresponds to the eccentricity 21 given to the pinion 6. Since the distances between the center longitudinal axes of the pins 16 and the center longitudinal axes of the ball bearings 17 also correspond to the eccentricity 21, the pins 16 remain in constant contact with the ball bearings 15. Additionally, since pinion 6 remains in constant meshing engagement with the gear 5, the center 19 of the pinion 6 is able to rotate about the center longitudinal axis 20 of the drive shaft 3 without any rotation of the pinion 6 about itself. The pins 16 rotate in the direction of arrow 22 about the ball bearings 15 corresponding to the rotary movement of the center 19 in the direction of arrow 18.

While we have shown and described several embodiments in accordance with the present invention, it is understood that the same is not limited thereto, but is susceptible of many changes and modifications within the scope of a person skilled in the art. For example, in the place of the ball bearings 15 and of the pins 16, crank-like elements may be provided which engage, on the one hand, in the housing and, on the other, at the pinion and the lengths of which correspond to the eccentricity given to the pinion.

Thus, it is obvious that the present invention is susceptible of many changes and modifications, and we, therefore, do not wish to be limited to the details shown and described herein, but intend to cover all such changes and modifications as are encompassed by the scope of the appended claims.

We claim:
1. A rotary piston internal combustion engine of trochoidal construction provided with polygonal piston means within an epitrochoidally-shaped housing means and with drive shaft means, comprising first eccentric means arranged at said drive shaft means for supporting thereon said piston means, said piston means being provided with internally toothed gear means, pinion means in meshing engagement with said internally toothed gear means, second eccentric means displaced by about 180° with respect to said first eccentric means for supporting said pinion means on said drive shaft means, and means in said internal combustion engine for preventing rotation of said pinion means about itself during the rotary movements thereof about the axis of said drive shaft means.

2. A rotary piston internal combustion engine of trochoidal construction provided with polygonal piston means within an epitrochoidally-shaped housing means and with drive shaft means, comprising first eccentric means arranged at said drive shaft means for supporting thereon said piston means, said piston means being provided with internally toothed gear means, pinion means in meshing engagement with said internally toothed gear means, second eccentric means displaced by about 180° with respect to said first eccentric means for supporting said pinion means on said drive shaft means, and means in said internal combustion engine for preventing rotation of said pinion means about itself during the circular movements thereof about the axis of said drive shaft means including substantially annularly-shaped intermediate means and means operatively connecting said intermediate means with said pinion means, on the one hand, and with the side wall of said housing means, on the other, in such a manner that said intermediate means is able to move substantially within a diametric plane of said pinion means and a plane perpendicular thereto with respect to said housing means.

3. A rotary piston internal combustion engine of trochoidal construction provided with polygonal piston means within an epitrochoidally-shaped housing means and with drive shaft means, comprising first eccentric means arranged at said drive shaft means for supporting thereon said piston means, said piston means being provided with internally toothed gear means, pinion means in meshing engagement with said internally toothed gear means and provided with guide cam means, second eccentric means displaced by about 180° with respect to said first eccentric means for supporting said pinion means on said drive shaft means, and means in said internal combustion engine for preventing rotation of said pinion means about itself during the circular movements thereof about the axis of said drive shaft means including substantially annularly-shaped intermediate means provided with guide means and means operatively connecting said intermediate means with said pinion means, on the one hand, and with the side wall of said housing means, on the other, in such a manner that said intermediate means is able to move substantially within a diametric plane of said pinion means and in a plane perpendicular thereto with respect to said housing means, said connecting means being effectively constituted by a first part of said guide means facing said pinion means which is displaceable between said guide cam means and by a second part of said guide means facing said housing side wall which is displaceable in a groove of said housing side wall.

4. A rotary piston internal combustion engine of trochoidal construction provided with polygonal piston means within an epitrochoidally-shaped housing means and with drive shaft means, comprising first eccentric means arranged at said drive shaft means for supporting thereon said piston means, said piston means being provided with internally toothed gear means, pinion means in meshing engagement with said internally toothed gear means, second eccentric means displaced by about 180° with respect to said first eccentric means for supporting said pinion means on said drive shaft means, and means in said internal combustion engine for preventing rotation of said pinion means about itself during the circular movements thereof about the axis of said drive shaft means including crank means which engage said pinion means, the lengths of which correspond to the eccentricity of said pinion means, and which are supported at said housing means.

5. In a rotary piston internal combustion engine of trochoidal construction provided with a polygonal piston within an epitrochoidally-shaped housing, said piston carrying out a rotary movement about an eccentric arranged on the drive shaft of the engine and in which the rotary movement of the piston is produced by a pinion in meshing engagement with the internal teeth of a gear arranged at said piston, the improvement essentially consisting of eccentric means for supporting said pinion on said drive shaft, said eccentric means being displaced by about 180° with respect to said first-mentioned eccentric on which said piston is supported, and means for preventing any rotary movement of said pinion about itself during rotary movement thereof about the longitudinal axis of said drive shaft.

6. A rotary piston internal combustion engine of trochoidal construction provided with polygonal piston means within an epitrochoidally-shaped housing means and with drive shaft means, comprising first eccentric means arranged at said drive shaft means for supporting thereon said piston means, said piston means being provided with internally toothed gear means, pinion means in meshing engagement with said internally toothed gear means, second eccentric means displaced by about 180° with respect to said first eccentric means for supporting said pinion means on said drive shaft means, and means in said internal combustion engine for preventing rotation of said pinion means about itself during the circular movements thereof about the axis of said drive shaft means including three crank means displaced by 120° with respect to each other which engage said pinion means, the lengths of which correspond to the eccentricity of said pinion means, and which are supported at the side wall of said housing means.

7. A rotary piston internal combustion engine of trochoidal construction provided with polygonal piston means within an epitrochoidally-shaped housing means and with drive shaft means, comprising first eccentric means arranged at said drive shaft means for supporting thereon said piston means, said piston means being provided with internally toothed gear means, pinion means in meshing engagement with said internally toothed gear means, second eccentric means displaced by about 180° with respect to said first eccentric means for supporting said pinion means on said drive shaft means, and means in said internal combustion engine for preventing rotation of said pinion means about itself during the rotary movement about the axis of said drive shaft means including pin means arranged at said pinion means, and disk means arranged at said housing means, said pin means abutting against the cylindrical surfaces of said disk means, and the distance from the center of each pin means to the center of the associated disk means corresponding to the eccentricity of said pinion means.

8. A rotary piston internal combustion engine of trochoidal construction provided with polygonal piston means within an epitrochoidally-shaped housing means and with drive shaft means, comprising first eccentric means arranged at said drive shaft means for supporting thereon said piston means, said piston means being provided with internally toothed gear means, pinion means in meshing engagement with said internally toothed gear means, second eccentric means displaced by about 180° with respect to said first eccentric means for supporting said pinion means on said drive shaft means, and means in said internal combustion engine for preventing rotation of said pinion means about itself during the rotary movement about the axis of said drive shaft means including pin means arranged at said pinion means, and disk means effectively constituted by roller bearing means and arranged at said housing means, said pin means abutting against the cylindrical outer bearing race surfaces of said disk means, and the distance from the center of each pin means to the center of the associated disk means corresponding to the eccentricity of said pinion means.

9. A rotary piston internal combustion engine of trochoidal construction provided with a polygonal piston within an engine housing with a drive shaft and with an eccentric arranged at said drive shaft for supporting thereon said piston, comprising internally toothed gear means at said piston, pinion means in meshing engagement with said internally toothed gear means, eccentric means displaced by about 180° with respect to said eccentric for supporting said pinion means on said drive shaft, and means in said internal combustion engine for preventing rotation of said pinion means about itself during the rotary movements thereof about the axis of said drive shaft means.

10. A rotary piston internal combustion engine of trochoidal construction provided with polygonal piston means within an epitrochoidally-shaped housing means and with drive shaft means, comprising first eccentric means arranged at said drive shaft means for supporting thereon said piston means, said piston means being provided with internally toothed gear means, pinion means in meshing engagement with said internally toothed gear means, second eccentric means displaced by about 180° with respect to said first eccentric means for supporting said pinion means on said drive shaft means, and means in said internal combustion engine for preventing rotation of said said pinion means about itself during the rotary movement about the axis of said drive shaft means including three pin means displaced by 120° with respect to each other and arranged at said pinion means, and disk means effectively constituted by roller bearing means and arranged at the side wall of said housing means, said pin means abutting against the cylindrical outer bearing race surfaces of said disk means, and the distance from the center of each pin means to the center of the associated disk means corresponding to the eccentricity of said pinion means.

11. In a rotary piston internal combustion engine of trochoidal construction provided with a polygonal piston within an epitrochoidally-shaped housing, said piston carrying out a rotary movement about an eccentric arranged on the drive shaft of the engine and in which the rotary movement of the piston is produced by a pinion in meshing engagement with the internal teeth of a gear arranged at said piston, the improvement essentially consisting of eccentric means for supporting said pinion on said drive shaft, said eccentric means being displaced by about 180° with respect to said first-mentioned eccentric on which said piston is supported, and means for preventing any rotary movement of said pinion about itself during circular movements thereof about the longitudinal axis of said drive shaft including means between said pinion and said housing for limiting the movements of said pinion to said circular movements.

12. In a rotary piston internal combustion engine of trochoidal construction provided with a polygonal piston within an epitrochoidally-shaped housing, said piston carrying out a rotary movement about an eccentric arranged on the drive shaft of the engine and in which the rotary movement of the piston is produced by a pinion in meshing engagement with the internal teeth of a gear arranged at said piston, the improvement essentially consisting of eccentric means for supporting said pinion on said drive shaft, said eccentric means being displaced by about 180° with respect to said first-mentioned eccentric on which said piston is supported, and means for preventing any rotary movement of said pinion about itself during rotary movement thereof about the longitudinal axis of said drive shaft including intermediate means, first guide means between said pinion and said intermediate means, and second guide means between said intermediate means and said housing, said first and second guide means constraining movements of said pinion relative to said housing in two substantially orthogonal planes.

References Cited by the Examiner
UNITED STATES PATENTS 3,007,460   11/1961   Bentele et al. _____ 123—8

SAMUEL LEVINE, *Primary Examiner.*

RALPH H. BRAUNER, KARL J. ALBRECHT,
*Examiners.*

F. T. SADLER, *Assistant Examiner.*